J. L. McMILLAN.
ENVELOP OPENING MACHINE.
APPLICATION FILED OCT. 26, 1916.
1,317,804.
Patented Oct. 7, 1919.
2 SHEETS—SHEET 1.
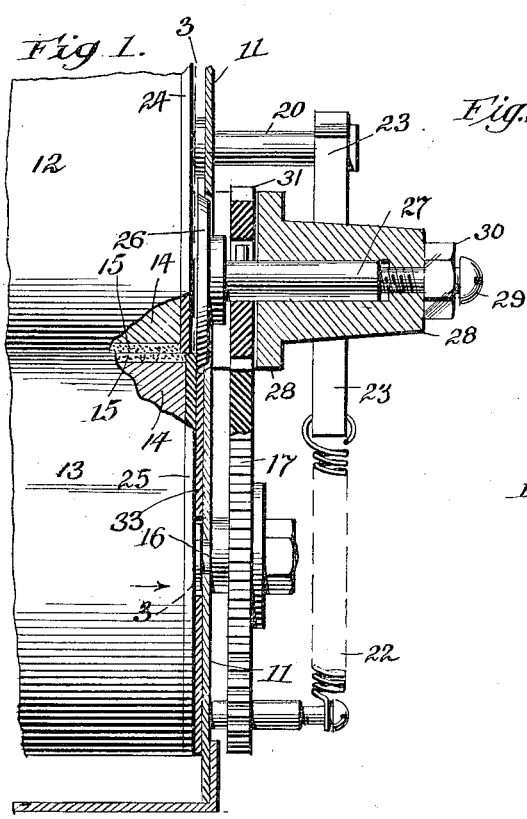
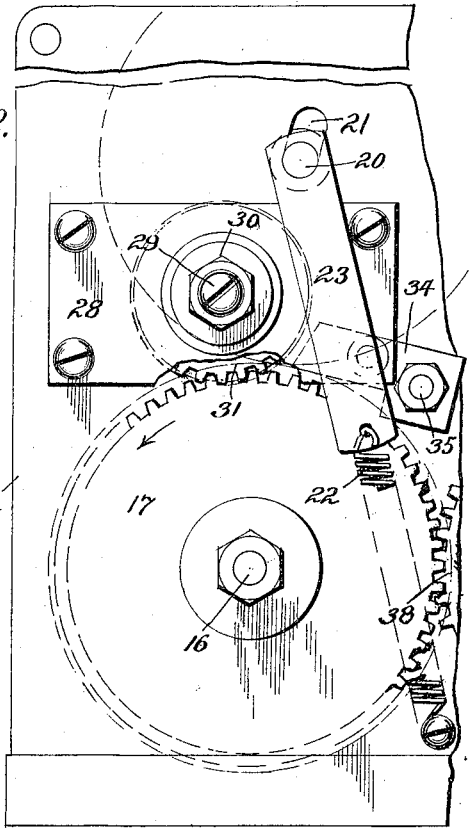
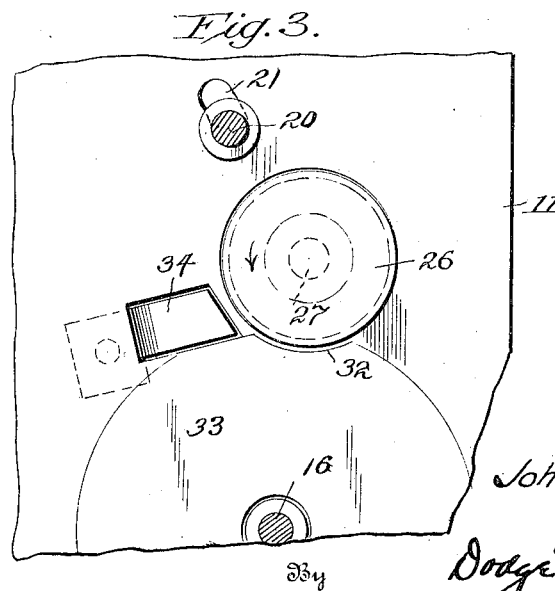
Inventor
John L. McMillan,
By Dodge and Sons,
Attorneys J. L. McMILLAN.
ENVELOP OPENING MACHINE.
APPLICATION FILED OCT. 26, 1916.
1,317,804.
Patented Oct. 7, 1919.
2 SHEETS—SHEET 2.
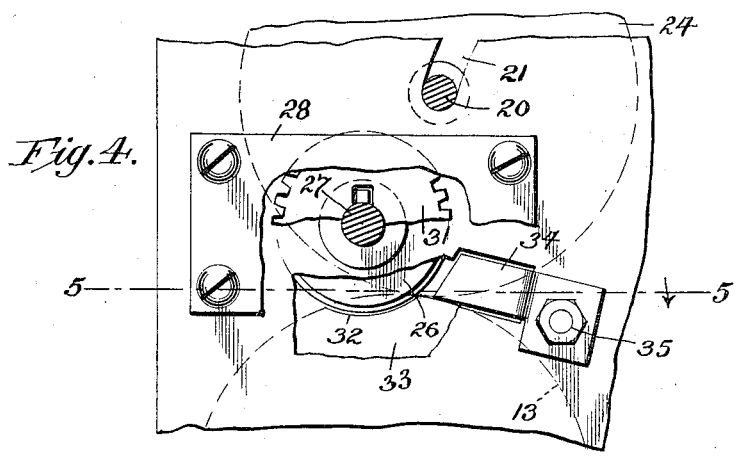
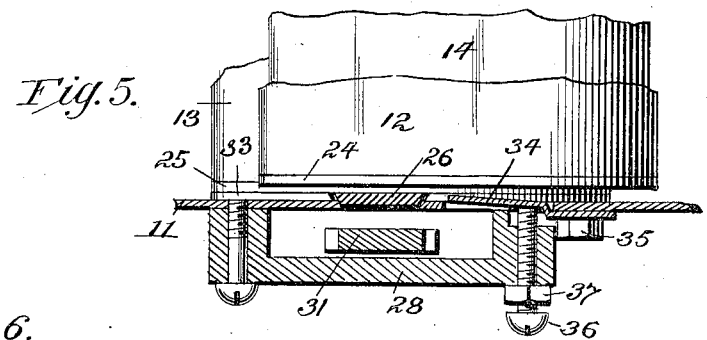
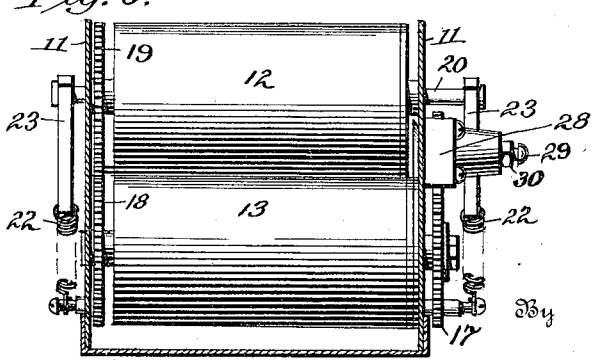
Inventor
John L. McMillan,
By Dodge and Sons,
Attorneys

UNITED STATES PATENT OFFICE.

JOHN L. McMILLAN, OF SYRACUSE, NEW YORK.

ENVELOP-OPENING MACHINE.

1,317,804.  Specification of Letters Patent.  Patented Oct. 7, 1919.

Original application filed May 18, 1916, Serial No. 98,427. Divided and this application filed October 26, 1916. Serial No. 127,837.

*To all whom it may concern:*

Be it known that I, JOHN L. McMILLAN, a citizen of the United States, residing at Syracuse, in the county of Onondaga and State of New York, have invented certain new and useful Improvments in Envelop-Opening Machines, of which the following is a specification.

This invention relates to machines for opening mail, such as letters and the like inclosed in envelops.

The present application is a division of my pending application for patent for improvements in envelop sealing and opening machines, Serial Number 98,427, filed May 18, 1916, and the claims of the present application are confined to the envelop shearing mechanism. Other features disclosed herein are claimed in the parent application, above identified.

The shearing mechanism forming the subject matter of the present divisional application includes envelop gripping rolls and a rotary shearing knife coacting with a metallic shear plate at or near the end of one of these rolls. The rotary knife may thus act on the envelop at or near the point where it is gripped. The knife operates to shear a thread or strip from the edge of the envelop. The amount thus sheared off may be determined by means of a guide finger which acts on the edge of the envelope and may be adjusted by any convenient means, such as a screw.

The invention as embodied for combination in the sealing and opening machine of said parent application, is illustrated in the accompanying drawings, in which:

Figure 1 is an elevation, with certain parts in section, showing the gripping rolls, rotary knife, and driving gears;

Fig. 2 is a side elevation of the structure shown in Fig. 1;

Fig. 3 is a section on the line 3—3 of Fig. 1;

Fig. 4 is a fragmentary view similar to Fig. 2, with parts broken away to show the envelop guide;

Fig. 5 is a section on the line 5—5 of Fig. 4; and

Fig. 6 is an elevation showing the mode of mounting the pressure rolls and gearing them together.

In the drawings 11 represents the frame of the machine, which may be made of metal plates and 12 and 13 are the pressure rolls. These usually have wooden cores 14, and are faced with rubber 15. Any facing material having a suitable tractive surface might be used instated of rubber.

The bottom roll 13 is fast on a shaft 16 which is journaled in the frame 11. Outside the frame at one end it carries a gear 17. Near the other end and inside the frame it carries a gear 18 which meshes with a companion gear 19, fast on the shaft 20. The pitch circles of the gears 18 and 19 are of substantially equal radius with their respective rolls 13 and 12 and thus cause the two rolls to turn together at equal peripheral speeds.

The shaft 20 of the upper roll 12 is journaled in slots 21 in frame 11 so as to be movable toward and from the roll 13 and the rolls are drawn together by springs 22 which are connected to the frame 11 and to yokes 23 journaled on the ends of shaft 20. The rolls 12 and 13 are thus adapted to grip an envelop firmly so as to feed it positively regardless of the thickness or unevenness of its contents.

At their ends remote from the gears 18 and 19 the rolls 12 and 13 are faced with metal disks 24 and 25, the disk 25 on the lower roll 13 being of steel with a sharp shearing edge which projects a substantial distance beyond the face of the disk 24 on roll 12, as clearly shown in Fig. 1.

A rotary shear knife 26 coacts with the shear disk 25, being in face engagement therewith. The knife 26 is fast on a shaft 27 journaled in the housing 28 and projects through an aperture in frame 11. It may be forced against the disk 25 with any desired pressure by means of a thrust screw 29. This is locked, when adjusted, by a nut 30. The knife 26 is driven by means of a gear 31 meshing with gear 17 and splined on shaft 27 within housing 28.

The knife 26 is partly housed in a notch 32 in a brass disk 33 which is inserted between shear disk 25 and frame 11 and is fixed in position. The function of the disk 33 is to strip from the disk 25 the thread or strip sheared from the envelop, and prevent its entering between the disk 25 and frame 11 which would cause clogging of the machine.

The axis of the knife 26 is so located and the knife is so proportioned that the point of shearing contact of its edge with the edge of disk 25, approximately coincides with the nip of the rolls 12 and 13. This arrangement assures the positive holding of the envelop at the point of shear and renders the shearing action certain.

The regulation of the width of the thread or strip sheared from the envelop is secured by an adjustable edge guide consisting of a resilient metal strip 34. The guide 34 is fixed at 35 to the frame 11 and projects inward through an aperture in that frame nearly to the knife 26. It may be adjusted by means of a thrust screw 36 which is locked in position by a check nut 37, the screw 36 being threaded in the housing 28, as shown.

In operation the rolls and knife are driven through any suitable connections such as a gear 38 meshing with gear 17. Hand or motor power may be used. The envelops are fed one by one to the rolls 12 and 13 with one edge pressed against the guide 34. This feeding may be manual or mechanical so far as the present invention is concerned. The rolls 12 and 13 then operate to draw the envelop forward, the knife 26 shearing a narrow strip from its edge where the latter is nipped by the rolls. The strip need be only wide enough to cause the knife to cut through the edge crease or fold of the envelop. Thus the necessary width of the strip is only slightly greater than the thickness of the paper. The narrowness of the strip is important as it reduces the danger of cutting matter inclosed in the envelop. The ability to cut such a narrow strip or thread with certainty, and regardless of the thickness of the contents of the envelop is in a large measure the result of placing the shear knife so as to cut at or close to the nip of the rolls.

Another advantage arises from the fact that the knife is wholly independent of the rolls and may be driven at a relatively higher peripheral speed, so as to give a clean rapid shearing action.

Having thus described my invention, what I claim is:—

1. A device for opening envelops comprising, in combination, a pair of pressure rolls; a shear-plate on the end of one of said rolls; a rotary knife in face engagement with said plate and co-acting therewith to shear the edge of an envelop fed by said rolls, the point of shearing engagement between said plate and knife being at the nip of said rolls; and an adjustable thrust bearing for said rotary knife serving to move said knife into shearing relation with the shear-plate and to prevent its movement away from said plate.

2. A device for opening envelops comprising, in combination, a pair of pressure rolls; a shear-plate on the end of one of said rolls; a rotary knife in face engagement with said plate and co-acting therewith to shear the edge of an envelop fed by said rolls, the point of shearing engagement between said knife and plate being at the nip of said rolls; an adjustable thrust bearing for said rotary knife serving to move said knife into shearing relation with the shear-plate and to prevent its movement away from said plate; and an adjustable edge guide serving to limit the projection of the envelop past the knife.

3. A device for opening envelops comprising, in combination, a pair of pressure rolls; a shear-plate on the end of one of said rolls; a rotary knife in face engagement with said plate and co-acting therewith to shear the edge of an envelop fed by said rolls, the axis of rotation of said knife being out of alinement with the axes of the pressure rolls and the point of shear being at the nip of the rolls; and an adjustable edge guide serving to limit the projection of the envelop past the knife.

4. A device for opening envelops comprising, in combination, a pair of pressure rolls; a shear-plate on the end of one of said rolls; and a rotary knife in face engagement with said plate and co-acting therewith to shear the edge of an envelop fed by said rolls, the axis of rotation of said knife being out of alinement with the axes of the pressure rolls, and the point of shear being at the nip of the rolls.

5. A device for opening envelops comprising in combination a pair of pressure rolls; and two coacting shearing members operative substantially at the point of nip of said rolls, one of said shearing members having its axis out of alinement with the axes of the pressure rolls.

6. A device for opening envelops comprising in combination a pair of parallel pressure rolls; a rotary shearing disk; and a rotary shearing knife in shearing contact with said disk substantially at the point of nip of said rolls, the shearing knife having its axis of rotation out of alinement with the axes of the pressure rolls.

7. A device for opening envelops comprising in combination a pair of pressure rolls; a rotary shearing disk; a rotary shearing knife in shearing contact with said disk substantially at the point of nip of said rolls; and an adjustable thrust bearing for said rotary knife, serving to move said knife into shearing relation with said disk and to prevent its movement away from the same.

8. A device for opening envelops, comprising in combination a pair of pressure rolls; a rotary shearing disk; a rotary shearing knife in shearing contact with said disk substantially at the point of nip of said rolls and having its axis of rotation out of alinement with the axes of the pressure rolls; and an adjustable edge guide serving to limit the projection of the envelop past the knife.

9. A device for opening envelops, comprising in combination a pair of pressure rolls; a rotary shearing disk; a rotary shearing knife in shearing contact with said disk substantially at the point of nip of said rolls, and having its axis of rotation out of alinement with the axes of the pressure rolls; an adjustable thrust bearing for said rotary knife, serving to prevent movement of the rotary knife away from the shearing disk; and an adjustable edge guide serving to limit the projection of the envelop past the knife.

In testimony whereof I have signed my name to this specification.

JOHN L. McMILLAN.

Copies of this patent may be obtained for five cents each, by addressing the "Commissioner of Patents. Washington, D. C."